United States Patent [19]

Fowler et al.

[11] Patent Number: 5,551,037
[45] Date of Patent: Aug. 27, 1996

[54] APPARATUS AND METHODS FOR VISUALIZING OPERATION OF A SYSTEM OF PROCESSES

[75] Inventors: Glenn S. Fowler, Scotch Plains, N.J.;
David G. Korn, New York, N.Y.;
Elefterios Koutsofios, Chatham;
Stephen C. North, Califon, both of N.J.

[73] Assignee: Lucent Technologies Inc., Murray Hill, N.J.

[21] Appl. No.: 154,771

[22] Filed: Nov. 19, 1993

[51] Int. Cl.$^6$ ................................................ G06F 3/153
[52] U.S. Cl. ............................................................ 395/700
[58] Field of Search ...................................... 395/650, 700

[56] References Cited

U.S. PATENT DOCUMENTS

| | | | |
|---|---|---|---|
| 5,179,702 | 1/1993 | Spix et al. | 395/650 |
| 5,265,254 | 11/1993 | Blasciak et al. | 395/700 |
| 5,291,587 | 3/1994 | Kodosky et al. | 395/500 |
| 5,450,586 | 9/1995 | Kuzara et al. | 395/700 |

OTHER PUBLICATIONS

Fowler et al., "A User–Level Replicated File System"; Summer USENIX, Cincinnati Summer Conference Proceedings; Jun. 1993; pp. 279–290.
Gansner et al., "A Technique for Drawing Directed Graphs", IEEE Transactions on Software Engineering, vol. 19, No. 3, Mar. 1993, pp. 214–230.
"Was Geschiecht Wann Wo Im Programm.", Technische Rundschau, vol. 82, No. 35, Aug. 31, 1990, Bern CH, pp. 48–57.
"Method of Tracing Events in Multi–threaded OS/2 Applications", IBM Technical Disclosure Bulletin, vol. 36, No. 09A, Sep. 1993, New York, pp. 19–21.
"Tracing the Exported Entry Points in an OS/2 Dynamic Link Library", IBM Technical Disclosure Bulletin, vol. 33, No. 6B, Nov. 1990, New York, US, pp. 140–141.
E. Krell, B. Krishnamurthy, "COLA: Customized Overlaying", Proceedings of USENIX San Francisco Winter 1992 Conference, San Francisco, CA, 1992, pp. 3–7.
*Insight, User's Guide Version* 1.0, Parasoft Corporation, Pasadena, CA 91107, pp. 1–x, and 1–40.
"fuser(IM)", man pages from *Implementations of the UNIX® Operating System*, pp. 1–2.
"Ofiles(1)", man pages from *Implementations of the UNIX® Operating System*, pp. 1–2, Sun Release 4.0, Last change: Jul. 23, 1990.
"Trace(1)", man pages of *Implementations of the UNIX® Operating System, Sun Release 4.0*, Last change: 8 Aug. 1989, pp. 1–2.
A. Beguelin, et al., "Visulization and Debugging in a Heterogeneous Environment", IEEE Computer, 1993, pp. 88–95.
D. Dobkin, et al., "LEFTY: A Two–view Editor for Technical Pictures", *Graphics Interface '91*, pp. 68–76.
E. Krell, et al., "COLA: Customized Overlaying", USENIX Conference 1992.

*Primary Examiner*—Thomas M. Heckler
*Attorney, Agent, or Firm*—Gorndon E. Nelson

[57] ABSTRACT

Techniques for analyzing and controlling operation of a system of cooperating processes. A library of system calls used by the processes is replaced by a dynamically-linked library which performs the system calls and also sends messages indicating that the system calls have been performed. The messages are received by a display system which responds to the messages by making a graphical display showing the current state of the system of processes. The graphical display displays the system of processes as a tree. Nodes in the tree represent the processes in the system and resources such as files used by the processes; edges in the tree represent relationships between processes and other processes or resources. Users may control which system calls result in messages, may control the rate at which the display system responds to the messages, and may also control execution of the processes.

33 Claims, 5 Drawing Sheets

FIG. 3
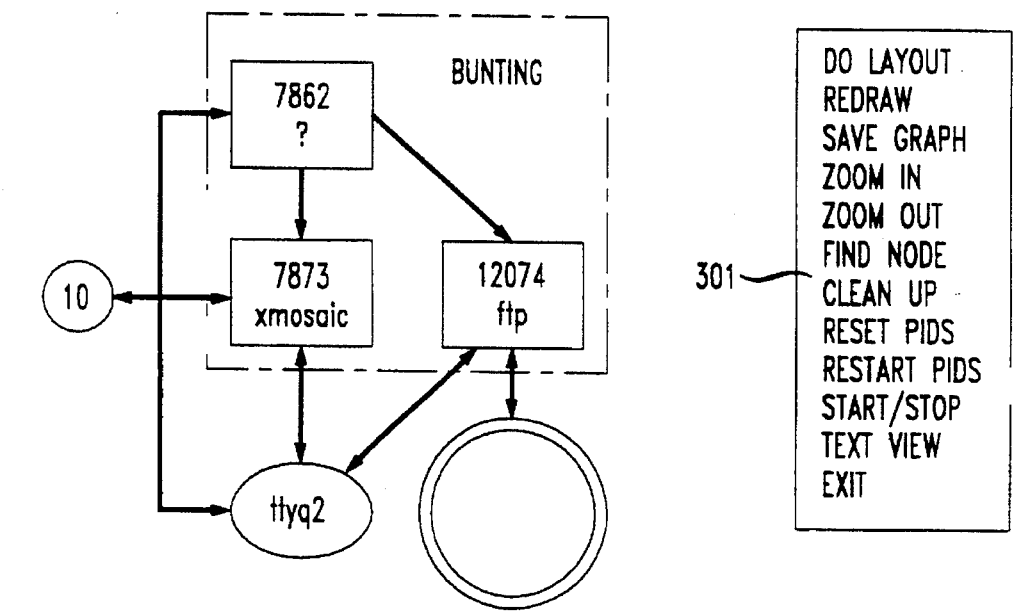
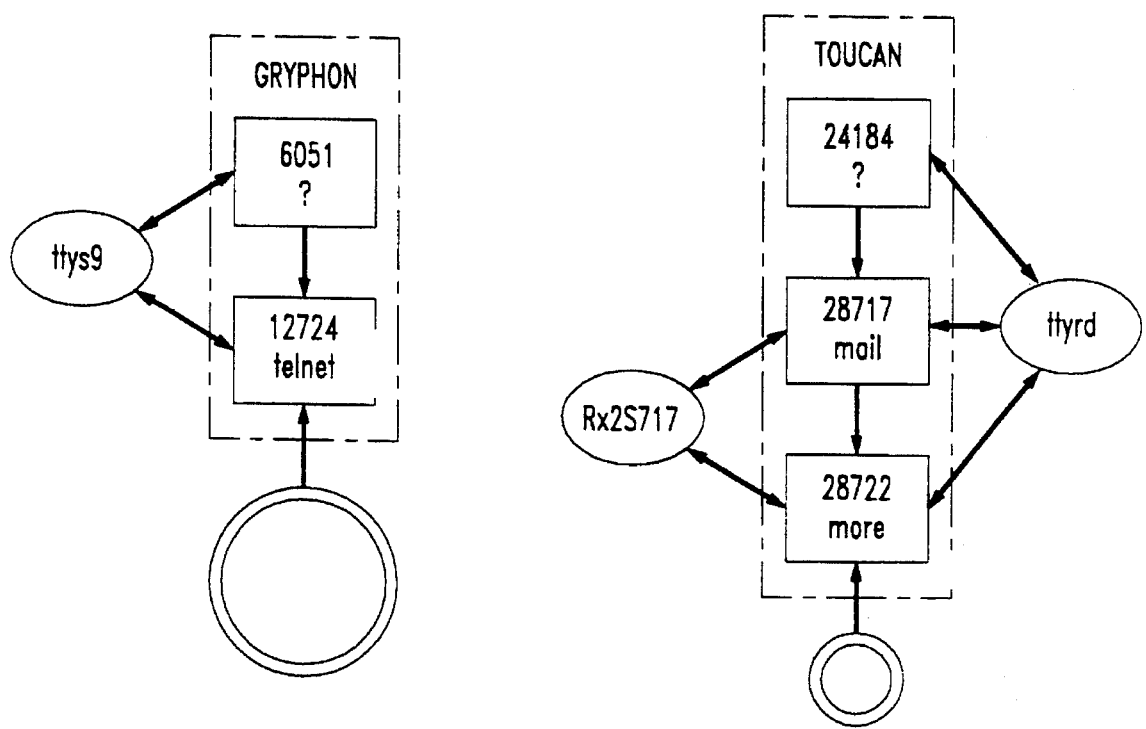

APPARATUS AND METHODS FOR VISUALIZING OPERATION OF A SYSTEM OF PROCESSES

BACKGROUND OF THE INVENTION

1. Field of the Invention

The invention concerns analysis and control of systems and more nearly concerns analysis and control of systems made up of processes executing in computers.

2. Description of the Prior Art

An important part of building large systems is debugging, that is, detecting, analyzing, and correcting errors in an implementation of the system. When a system is implemented by means of programs executing in computers, there are many tools available for debugging the programs. There are discovery programs such as cia which help programmers understand how a program is organized and programs called debuggers, which permit the programmer to see what happens when a program being debugged is executed. Modern debuggers permit the programmer to interactively control the execution of the program being debugged. An example of such a debugger is the GDB debugger, available from the Free Software Foundation. Debuggers have further begun to use graphical interfaces to show information such as the call history of a program, events generated by distributed-memory parallel programs, or a trace of a parallel execution of a program. One example of such graphical interfaces may be found in Adam Beguelin, et al., "Visualization and Debugging in a Heterogeneous Environment", in: *IEEE Computer,* June, 1993, pp. 88–95.

The discovery programs and debuggers just described are perfectly adequate for their task; however, modern systems are typically implemented not just as sets of cooperating subroutines, but rather as sets of cooperating processes. For purposes of the present discussion, a process may be defined as the entity in a computer system which actually executes a program for a user. In many systems, the cooperating processes execute on different computers. When a system is implemented as a set of cooperating processes, debugging the system involves not only understanding and debugging the individual programs executed by the processes, but also understanding and debugging the cooperation of the processes. The latter tasks cannot be performed by the program discovery tools and debuggers just described.

Present-day computer systems provide only meager resources for debugging systems made up of cooperating processes. In computer systems employing the UNIX operating system (UNIX is a registered trademark of UNIX Systems Laboratories), for example, there is a trace utility which outputs list of the calls made by the process to the operating system. There are also an ofiles utility which tells the user what files a given process has open and a fuser utility which identifies what processes are using a given file. A drawback of even these meager debugging tools is that they can only provide information about processes executing on a single processor and consequently only have limited usefulness in understanding and debugging systems where the cooperating processes execute on different processors.

It is an object of the present invention to overcome the above problems with debugging systems made up of cooperating processes by providing techniques which permit close analysis and control of such systems.

SUMMARY OF THE INVENTION

The techniques of the invention are embodied in a visual process manager. The visual process manager has two parts: a monitor which sends messages when the processes in the system execute operating system calls for operations such as creating a child process or accessing a resource such as a file, and a graphical display generator which generates a display in response to the messages. The display shows the state of the system of processes and changes as required by the messages. The user can thus determine from the display what is happening in the system of processes. The user can further employ a pointing device such as a mouse to control the display and even the system of processes.

In the preferred embodiment, the display is a directed acyclic graph of nodes and edges. The processes and the resources they access are nodes in the graph, and the edges connecting the nodes indicate relationships between the nodes. For example, a node representing a process is connected to the node for its parent by an edge, and the node for a file which is being accessed by a process is connected to the node for the process by another edge. An important advantage of the visual process manager is that no alteration in the code executed by the processes is required. The monitor is implemented by means of a dynamically-linked library which replaces the library of operating system calls provided with the computer system with a new library which not only makes the system calls, but also generates the messages. Per-process masks in the monitor permit the user to indicate which system calls will result in messages, what the form of the messages should be, and whether the library routine for the system call should await acknowledgment from the user before continuing.

While the preferred embodiment employs the techniques disclosed herein to analyze systems of processes, the techniques are generally applicable and may be employed in any situation where a library of routines may be replaced by a dynamically-linked library of routines which perform the same functions, but also send messages as a side effect. A particular advantage of the techniques is that a system may be analyzed without modification or recompilation of the system's application-level code. Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 3 is another example display generated by the invention;

FIG. 6 is a diagram of a message employed in the invention; and

Figure 1:
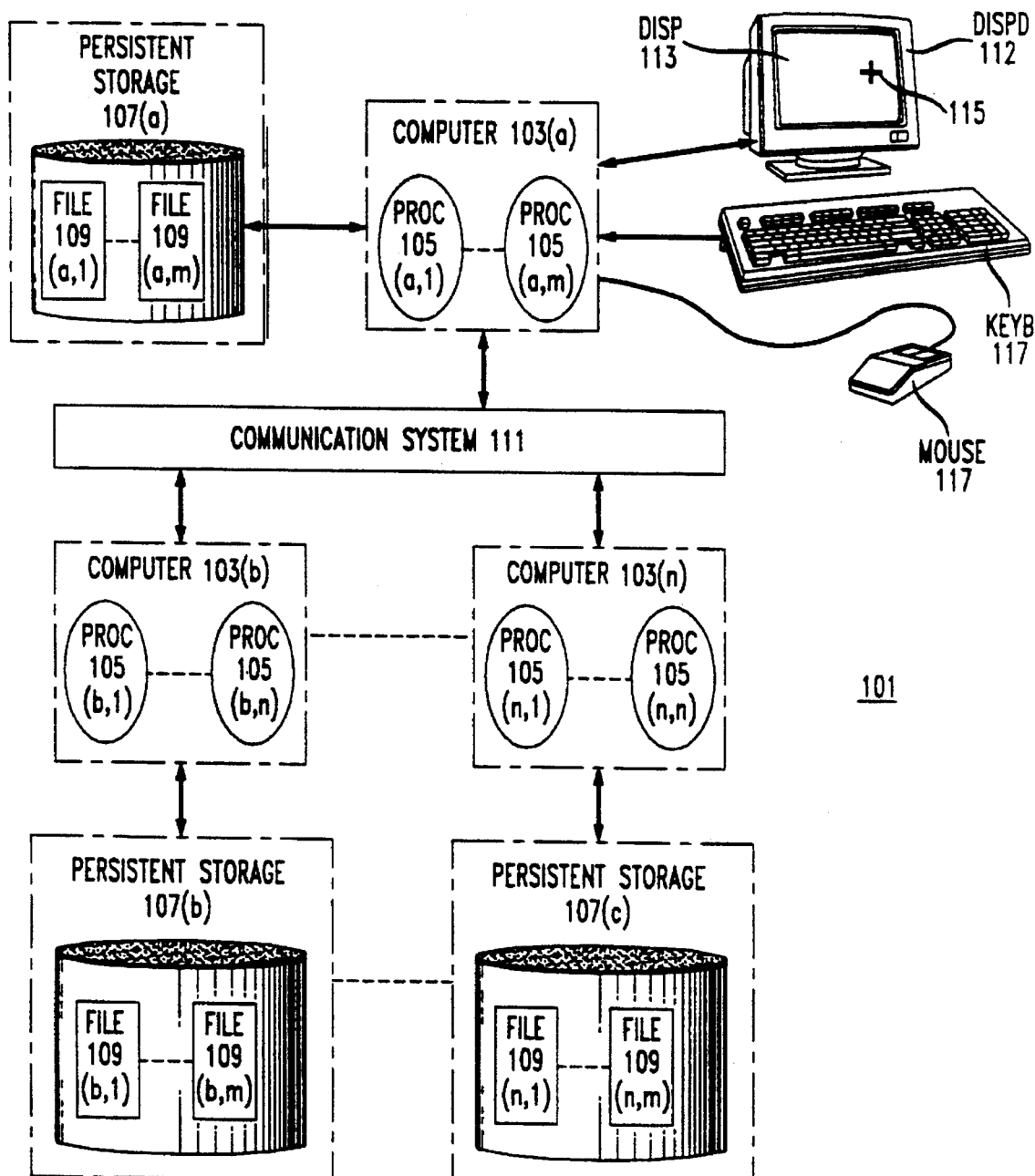
FIG. 1 is a conceptual drawing of a distributed computer system in which the present invention may be implemented.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first describe a system in which the invention may be implemented, will then show how a preferred embodiment of the system appears to a user, and will finally describe the implementation of a preferred embodiment in detail.

A System in which the Visual Process Manager may be Embodied: FIG. 1

FIG. 1 shows a conventional modern distributed computer system. Some number of processors 103 communicate with each other via communications system 111, which may be any system which permits messages to be sent between the processors 103. Executing programs on each processor are a number of processes 105. Processes 105 may send messages to other processes 105 executing on the same or other processors 103; messages to processes executing on other processors 103 are sent via communications system 111. Processes 109 may also access files 109 in persistent storage 107. The files may be on persistent storage 107 belonging to the processor 103 upon which the process 105 is executing or on persistent storage 107 belonging to another processor 103.

A user of the Visual Process Manager has a display device 112 and input devices such as keyboard 117 and mouse 119 connected to one of the processors 103, in this case processr 103(a). By means of keyboard 117 or mouse 119, the user can provide inputs to processor 103(a) in response to displays on display 113 on display device 112. More particularly, the user can employ mouse 119 to move pointer 115 in display 113 and can use the buttons on mouse 119 to provide command inputs.

Figure 2:
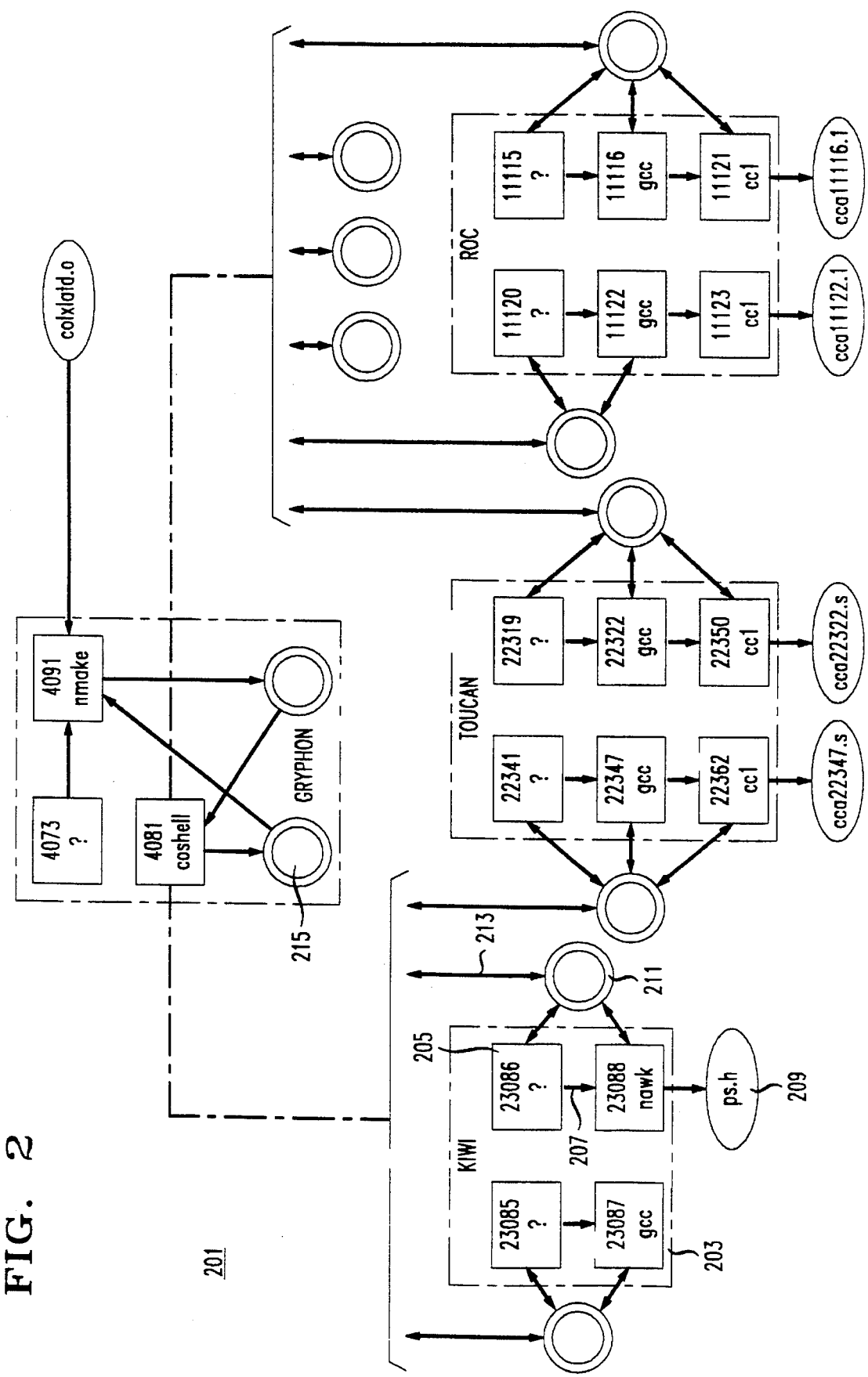
FIG. 2 is an example display generated by the invention.
Figure 5:
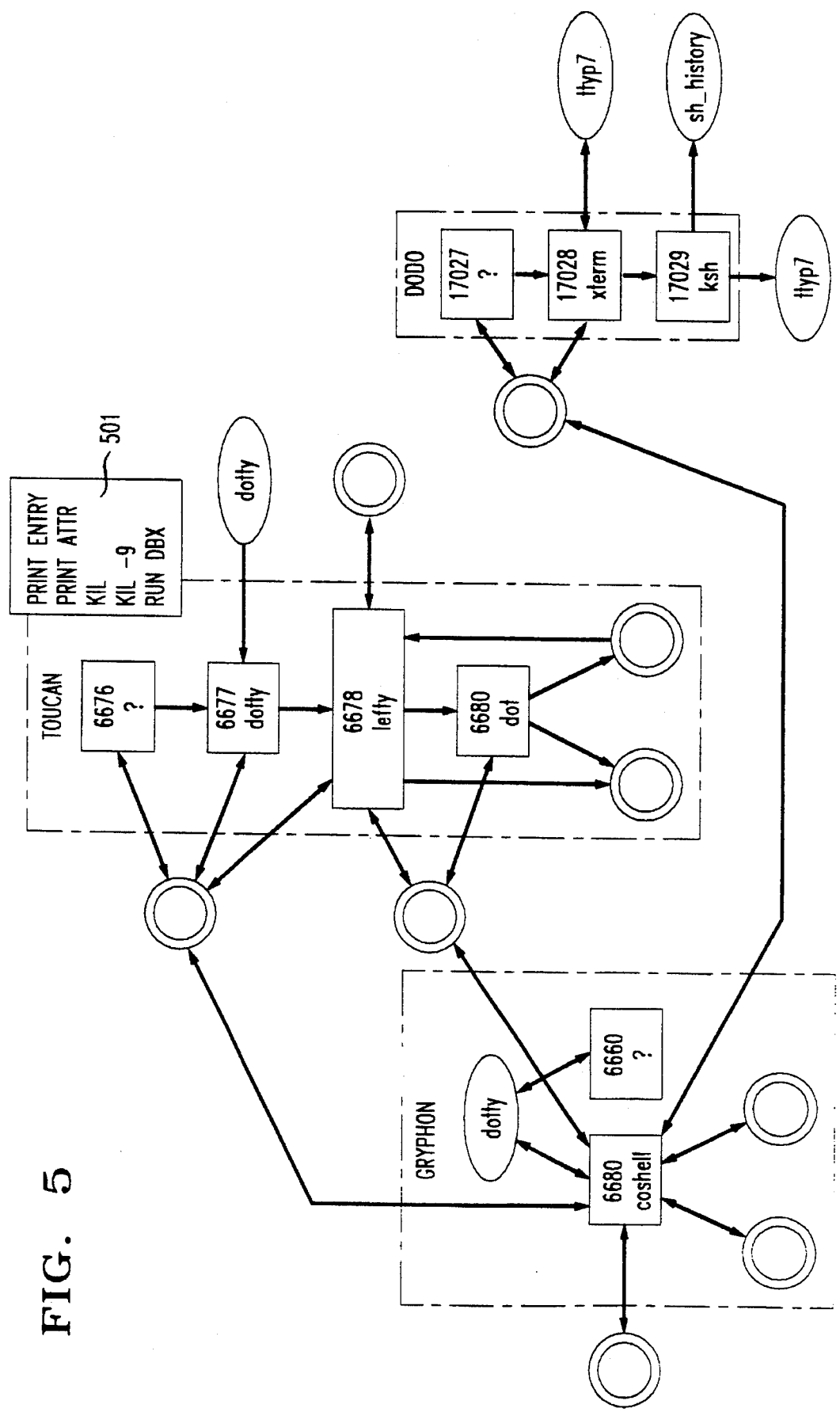
FIG. 5 is a further example display generated by the invention.

User View of the Visual Process Manager: FIGS. 2, 3, and 5

A user of the visual process manager will generally be working with a display like that shown in FIG. 2. Graph 201 appears on display device 112. In most embodiments, processor 103 will be running a windowing system and graph 201 will appear in a window in display 113. Graph 201 is a directed acyclic graph which shows a system of cooperating processes which are executing on four computers. Each computer is represented by a cluster 203 with the name of the computer (for example, kiwi). Inside each cluster is a group of process boxes 205. Each process box 205 represents a process 105 executing on the computer represented by the cluster. The number inside the process box 205 is the process identifier (pid) for the process. The process identifier is the number used by the operating system of computer 203 to identify the process. The character string is the name of the program currently being executed by the process. Thus, process 105 with pid 23087 is executing the gcc program. Processes 105 whose process boxes 205 contain ? are executing a process initialization program. The dotted edges 207 indicate parent-child relationships between processes 105. A process 105 is a parent of another process 105 if the parent process executed the operating system command which created the other process 105. Thus, process 23086 is the parent of process 23088.

Processes 105 may of course access files 109. The files appear in graph 201 as file ellipses 209. Each file ellipse 209 contains a character string which is the name of the file represented by file ellipse 209. When a process 105 has opened a file 109, there is a solid edge 213 connecting process box 205 for the process and file ellipse 209 for the file. If the process 105 has opened the file for reading, there is an arrowhead at process box 205; if the process 105 has opened the file for writing, there is an arrowhead at file ellipse 209; if the file has been opened for both reading and writing, there is an arrowhead at both ends of edge 213.

Processes 105 communicate in the systems in which the invention is employed by means of the pipes and sockets provided by the UNIX operating system. Pipes are used only for communications between processes executing on the same computer 103 and sockets are used for communications between processes executing on different computers 103. In the case of the sockets, the communications actually travel via communications system 111. Pipes and sockets appear in graph 201 as pipe circles 215 and socket circles 211. A socket circle 211 contains the name of the computer which was the destination of the socket when it was created and the number of the port in the destination computer. Edges 213 are used with pipe circles 215 and socket circles 211 in the same fashion as with file ellipses 209: if the pipe or socket is open for writing, the arrowhead is at circle 211 or 215; if the pipe or socket is open for reading, the arrowhead is at process box 205. In the version of the UNIX operating system in which the preferred embodiment is implemented, pipes are unidirectional; one process writes to the pipe and the other reads from the pipe; sockets, on the other hand, are bidirectional.

Operation of the Visual Process Manager: FIGS. 3 and 5

In a preferred embodiment, the visual process manager consists of two main components, one of which monitors the processes in a system as they execute, and one of which receives messages from the monitoring component and generates a graph 201 in response to the messages. The components in the preferred embodiment are a monitor based on the ndimensional file system (nDFS), described in Glenn Fowler, Yennun Huang, David Korn, and Herman Rao, "A user-level replicated file system", in: *USENIX Cincinatti* 1998 *Summer Conference Proceedings*, pp. 279–290, 1993, and a display generator based on the programs dot, explained in Emden R. Gansner, Eleftherios Koutsofios, Stephen C. North, and Kiem-Phong Vo, "A Technique for Drawing Directed Graphs", in: *IEEE Transactions on Software Engineering*, vol. 19, no. 3, March, 1993, and lefty, described in Eleftherios Koutsofios and David Dobkin, "Lefty: a two-view editor for technical pictures, in: *Graphics Interface* '91, pp. 68–76, Calgary, Alta, 1991.

To commence operation of the visual process manager in a preferred embodiment, the user starts a first process which executes the display generator and a second process which executes the monitor. Each process has its own window in display device 112. Once the second process is running, the user executes a setup command in the second process's shell which specifies a log file to which the monitor sends message and from which the display generator is to take its input and the operating system system calls which are to be monitored by the monitor. In a preferred embodiment, a user may specify only process-related operating system calls, process-related operating system calls and file access related operating system calls, and the two foregoing classes together with I/O system calls. In the preferred embodiment, the process-related operating system calls are the UNIX fork, exec, and exit calls, the file-access related calls are open, close, dup, and pipe, and the I/O calls are read and write. Once the foregoing setup command has been executed, the monitor begins sending messages to the log file read by the display generator and the current state of the process in which the setup command executes and that process's descendents may be displayed in graph 201. Thus, all that is required to monitor a given system of processes is to start the first process of the system as a child of the process in which the setup comand is executed.

The display generator operates in two modes: real time and single step. In real time mode, the display generator reads the messages in the log file as the monitor places them in the log file; in single step mode, the system being monitored runs until it terminates, with all messages from the monitor being placed in the log file. Thereupon, the display generator reads the messages in the log file. In a preferred embodiment, the mode is specified by means of an option on the command which commences execution of the display generator. In either case, graph 201 is dynamically updated as messages are read from the log file.

Operation of the display generator in either mode is controlled by a global menu which appears in graph 201 when pointer 115 is not positioned over a node in graph 201 and the right mouse button is pressed. FIG. 3 shows a global menu 301 for the real time mode. The menu options are the following:

do layout: redo the layout of graph 201;

redraw: refresh the graph;

save graph: save the graph to a file;

zoom in: enlarge the graph;

zoom out: reduce the graph;

cleanup: removes nodes representing dead processes from graph 201;

find node: scroll the display so that a node specified by pid or name is at the center of the display of graph 201;

start/stop: stop updating the graph until the item is selected again;

textview: look at the program currently being interpreted by the display generator; and exit: end execution of the display generator.

Options are selected by using the mouse to move pointer 115 to the desired entry in the menu and depressing the left mouse button. When graph 201 is larger than the window in which it is being displayed, the user may employ scroll bars on the window to bring undisplayed portions of the graph into the window.

The global menu for single-step mode differs from the menu for real-time mode in that start/stop and clean-up are replaced by the following two selections:

play non-stop: the display generator will respond to the messages in the log file without stopping; and play until: the user may specify a system call name or a message sequence number; the display generator will respond to messages in the log file until the named system call or the specified message in the sequence is reached.

When neither play non-stop nor play until has been selected, the user controls the rate at which the messages are read with the mouse: when the user clicks with the left-hand button, the next message is read and graph 201 modified accordingly. Single-step mode thus gives the user the option of viewing only those portions of the operation of the system of processes in which he is interested.

Menus for the nodes of graph 201 permit the user to find out information about individual nodes and in the case of process boxes 205, to manipulate the processes. To obtain a node menu, the user moves pointer 115 to the desired node and clicks with the right mouse button. The contents of a node menu depend on the kind of node and on whether the display generator is operating in real time or single step mode. FIG. 5 shows node menu 501 for process box 6678 in real time mode. The possible menu selections are the following:

print entry: print information about the entity represented by the node; in a process node, the information includes the node kind, the id of the machine the process is running on, the name of the machine, the process's pid, and the pathname of the program being currently executed by the process;

print attributes: print the display attributes for the node, for example its color, shape, font name, and font size;

kill: execute the UNIX operating system kill command on the process to terminate it; the process may ignore the command;

kill-9: execute kill in a form which requires that the process be terminated; and run dbx: run a debugger on the program being executed by the process.

In single-step mode, only the print entry and print attr selections are available.

The menus for file ellipses 209 include only the print entry and print attr selections in both modes; when print entry is selected, the file's name, device name and inode name are displayed. The menus for pipe and socket circles 211 include those selections, and additionally a show message selection, which shows the messages passing through the selected pipe or socket when the monitor is monitoring I/O system calls. With print entry for a pipe, the identifier is displayed by which each process using the pipe knows the pipe and with sockets, the socket's name and the source and destination machine names and ports are displayed.

Figure 4:
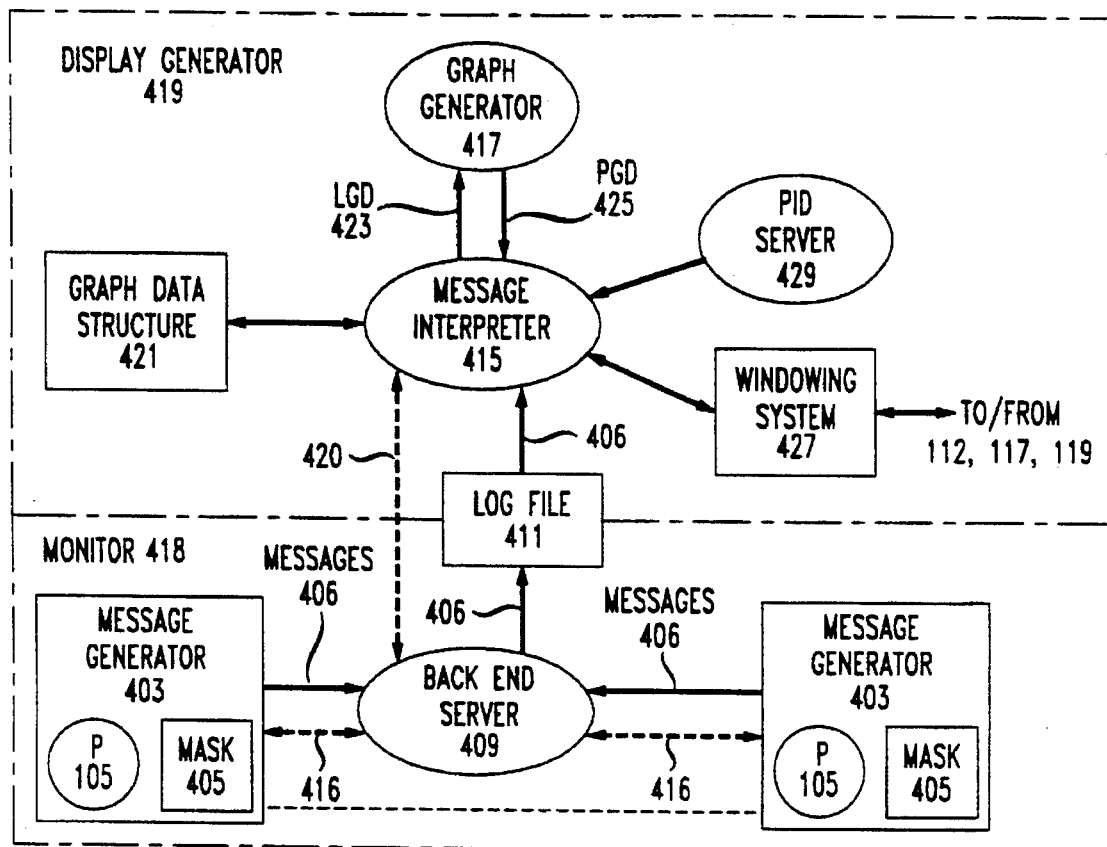
FIG. 4 is an overview of an implementation of the invention.
Figure 7:
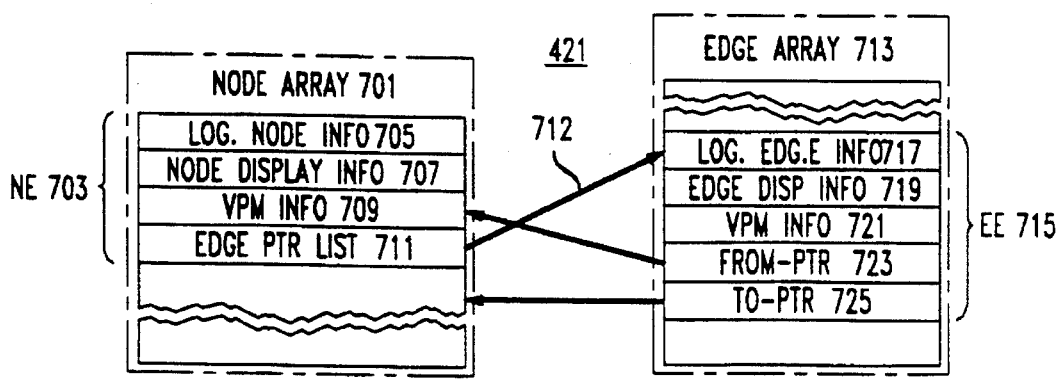
FIG. 7 is a diagram of a graph data structure employed in the invention.

Detailed Implementation: FIGS. 4, 6, and 7

An overview of an implementation of the preferred embodiment of the visual process manager is given in FIG. 4. Visual process manager 401 has the two main components previously discussed: monitor 418, which monitors the behavior of the processes 105 belonging to the system being studied, and display generator 419, which generates display 201 on display device 113 and responds to inputs from keyboard 117 and mouse 119. Communication between the components occurs in a preferred embodiment via log file 411, into which monitor 418 writes messages 406 received from the processes 105 being monitored and from which display generator 419 reads the messages.

Monitor 418

Continuing in more detail with monitor 418, its components consist of a message generator 403 for each process 105 belonging to the system being studied and a back end server process 409. Message generator 419 generates messages when the process 105 performs the system calls being monitored. Back end server process 409 receives the messages from the processes 105 and writes them to log file 411. Communication between the processes 105 and back end server 409 is by means of sockets provided by the UNIX operating system.

As described in detail in the Fowler, et al. article cited above and in Fowler, et al., U.S. patent application Ser. No. 08/0037, User-Level Replicated File System, filed Jun. 18, 1993, message generator 403 is implemented by dynamically linking each process 105 to the executable code for a set of library routines. The process 105 being monitored executes the dynamically-linked code in place of the code for the standard system calls provided by the UNIX operating system. The dynamic linking occurs when the process is initialized. Because the executable code is dynamically-linked at process initialization, there is no need to alter or relink the application code being executed by the process. A detailed discussion of dynamic linking may be found in *Shared Libraries,* Sun Microsystems, Inc., Mountain View Calif., 1988.

The code in the library routines for a given UNIX system call invokes the system call; in addition, however, it produces side effects. In the visual process manager, the side effects include the messages 406. FIG. 6 shows the details of a message 406. The message includes the following fields:

source pid (SPID) 601, the pid of the process 105 which made the system call which resulted in the message;

source machine (SMACH) 603, an identifier for the computer on which process 105 is executing;

system call name (Syscall Name) 605, the name of the system call made by the process 105;

system call arguments (Syscall Args) 607, the arguments of the system call made by the process 105; and system call results (Syscall results) 609, the results of the system call made by the process 105.

In a message 406 for an open system call, for example, the arguments 607 include the pathname of the file to be opened and the mode in which it is opened, and the result 609 includes the newly-opened file's device number and inode number.

As indicated above in the description of the user view of the visual process manager, a user may specify in the set up command which types of system calls are to be monitored. That information is stored in a mask 405 for each process 105. The routines in the dynamically-linked library check mask 405 for a process 105 before sending a message and send the message 406 only if the mask 405 indicates that the message is to be sent for that class of system calls. In the preferred embodiment, masks are set in the set up command and and are set for classes of system calls; the masks are then inherited by all of the processes being monitored. In other embodiments users may employ the menus to set masks for individual processes and system calls. The preferred embodiment additionally includes a "terse" mask which may be specified with system calls that return strings. When the terse mask is not set for the system call, the system call returns the string in message 406; when the terse mask is set, the system call returns a pointer to the string. Once a process's mask is set, either via the set up command or interactively, it is inherited by the process's descendents.

Display Generator 419

Display generator 419 is implemented as two processes, a message interpretation process 415 and a graph generating process 417. In a preferred embodiment, the message interpretation process 415 executes the lefty program, described in the Koutsofios reference cited above, and the graph generator process 417 executes the dot program, described in the North reference cited above.

Message interpreter 415 reads messages 406 from log file 411; in real-time mode, it reads the messages 406 as back end server 409 writes the messages to log file 411; in single-step mode, message interpreter 415 begins reading messages 406 from log file 411 only after the processes 105 in the system being monitored have all terminated. For each message, message interpreter 415 determines the type of system call from the message 406 and makes the changes required in graph data structure 421, which represents graph 201, by the message. If there are no more messages 406, or if a given number of messages 406 have been processed since the last redraw, display 201 is redrawn. What happens when graph 201 is redrawn depends on the kind of changes required by the messages 406. If the changes do not require a new layout of graph 201, message interpeter 418 simply takes information from graph data structure 421 and provides it to windowing system 427, which uses the information to actually display graph 201 on display device 112. If the changes do require a new layout, message interpreter 415 takes the information required for the new layout from graph data structure 421 and provides it to graph generator 417 as logical graph description 423. Graph generator 423 returns a physical graph description 425 based on the logical graph description to message interpreter 415; message interpreter 415 then incorporates the new physical graph description into graph data structure 421, and provides information from the updated graph data structure 421 to windowing system 427 as described above.

FIG. 7 provides details of graph data structure 421. Graph data structure 421 has two main components, node array 701, which contains a node entry 703 for each node in graph 201, and edge array 713, which contains an edge entry 715 for each edge in graph 201. Each node entry 703 contains four kinds of information:

logical node information 705, which message interpreter 415 provides as logical graph data 423 to graph generator 417;

node display information 707, which graph generator 417 provides to message interpreter 415 as physical graph data 425 in response to logical graph data 423;

visual process manager information 709; and edge pointer list 711.

The visual process manager information 709 is the information which appears in the node in display 201 and in the menu associated with the node represented by node entry 703. The edge pointer list 711 contains a pointer to each edge entry 715 for an edge which begins or terminates at the node represented by node entry 703.

Edge entry 715 contains the same classes of information for each edge. Logical edge information 717 contains the information about the edge which message interpreter 415 provided to graph generator 417; edge display information 719 contains the information returned by graph generator 417 to message interpreter 415; VPM info 721 is the information which appears in the menu associated wth the edge; from_ptr 723 is a pointer to the node entry 703 in node array 701 which is the source of the edge; to_ptr 725 is a pointer to the node entry 703 in node array 701 which is the destination of the edge.

A limitation of monitor 418 as implemented in the preferred embodiment is that message interpreter 415 cannot always tell from messages 406 whether a process 105 has died. In a preferred embodiment, that problem is dealt with by having message interpeter 415 keep track of the time since the last message from a given process 105. If a certain time limit is exceeded, message intepreter 415 queries a pid server 429 on the computer the given process was running on to determine whether the process 105 is still alive. If it is not, message interpreter 415 removes the information for the process 105 from graph data structure 421, and on the next redraw of graph 201 the node for the process 105 and the nodes for any files or pipes accessed solely by the process will disappear.

Message interpreter 415 further deals with inputs from keyboard 117 and mouse 119, as provided by windowing system 427. For example, when a user presses the right mouse button to request a global menu or a node menu, message interpreter 415 determines what type of menu is required and provides the information for the menu to windowing system 427, which displays the window. Similarly, when a user selects a menu entry which requires display of information, windowing system 427 indicates that the selection has been made and message interpreter 415 obtains the information from graph data structure 421 and provides it to windowing system 427 for display. When a user selects the kill entry on the node menu for a specific process, message interpreter 415 executes the system command which kills the process 105.

An Interactive Version of visual Process Manager 401

In the preferred embodiment, a user at the terminal can only determine the rate at which messages in log file 411 are read by message interpreter 415; he cannot control the execution of the processes in the system by means of visual process manager 401. In another embodiment, the user may employ visual process manager 401 to actually control execution of the system of processes. In this embodiment, log file 411 is replaced by a socket 420 which directly connects back end server 409 to message interpreter 415; further, bidirectional sockets 416 now connect back end server 409 with the message generators 403 for the processes 105 being monitored.

Changes are also required in message 406, mask 405, and the code for the dynamically-linked library. Message 406 now carries an additional field, ACK field 611, which indicates whether message interpreter 415 has to acknowledge a message received from back end server 409. Mask 405 now includes an acknowledgement mask which indicates on a per-system call basis which system call requires acknowledgement. Finally, the dynamically-linked library routines are modified to include code which examines the acknowledgement mask before sending the message. If the mask indicates that the system call requires acknowledgement, the library routine which replaces the system call sets acknowledgement field 611 in the message and waits for an acknowledgement message from back end server 409; only after the message arrives does the library routine complete its execution.

Operation of the interactive mode is as follows: To place a process 105 in the mode, a user employs mouse 119 as previously described to obtain the menu 501 for the process. The menu 501 contains an additional entry, specifying interactive mode. When the user selects the entry, another menu appears which permits the user to specify which system calls are to be acknowledged for that process. Message interpeter 415 takes the input from the menu and sets fields for the node indicating what system calls are currently being acknowledged. Message interpreter 415 also sends a message via socket 420 to back end server 409 specifying the process 405 in which system calls are to be acknowledged and the system calls to be acknowledged. Back end server 409 then sends a message via socket 416 to the specified process 105, and code in message generator 403 responds to the code by setting the acknowledgement mask as required by the message.

From the time the acknowledgement mask is set, system 401 operates as follows: when process 105 executes a system call, the library routine for the system call checks acknowledgement mask 405 for the system call. If the mask is set, the message 406 has its acknowledgement field 611 set and the library routine pauses after executing the system call and sending the message 406. When the message arrives via socket 416, back end server 409, and socket 420 in message interpreter 415, message interpreter 415 responds to the set acknowledgement field 611 by changing graph 201 as required by the message 406 and changing the appearance of process box 205 for the process in the display to show that th process 105 represented by process box 205 is waiting for an acknowledgement. The user provides the acknowledgement by moving pointer 115 to the process box 205 and clicking with the left button. In response to the position of pointer 115 and the click of the left button, message interpreter 415 sends an acknowledgement message via socket 420, backend server 409, and socket 416 to message generator 403 for the process. In response to the message, the library routine finishes its execution. While this is going on, message interpreter 415 further changes the appearance of graph 201 to indicate that the process is no longer awaiting acknowledgement.

As will be clear from the foregoing, the user of system 401 can control execution of a process 401 to any desired degree of granularity. Other embodiments may also include an entry in global menu 301 permitting global setting of acknowledgement masks.

Conclusion

The foregoing Detailed Description has disclosed to those of ordinary skill in the arts to which the invention pertains the best modes presently known to the inventors for implementing their visual process manager. However, as already pointed out, the techniques used to implement the visual process manager are by no means limited to the analysis of systems of processes, but may be used in any system in which a library used by the system may be dynamically replaced by another library.

As will further be immediately apparent to those skilled in the relevant arts, there are many other ways of implementing the visual process manager disclosed herein. For example, the dynamic linking and graph drawing techniques disclosed herein are particularly advantageous for implementing the invention, but the library routines in monitor 418 could be statically linked to the code executed by the processes and graph drawing programs other than lefty and dot could be employed to implement display generator 419. The selection of operating system calls to be monitored will vary from operating system to operating system and may also vary according to the application for which the visual process manager is intended. Similarly, the kinds of masking available may differ from implementation to implementation.

In the same vein, the shapes, labels, and colors used in graph 201 in a preferred embodiment are all particularly advantageous, but other embodiments could employ other shapes and other colors and may also make different decisions concerning what information is shown directly on a node and what is accessible by menu. Further, other embodiments may offer the user more or less control of display 201 or of the operation of the system of processes, and may also employ different techniques for commencing execution of the system. Because the above is the case, the foregoing Detailed Description is to be considered in all respects exemplary and illustrative, but not restrictive, and the full scope of the invention disclosed herein is not to be determined from the Detailed Description, but rather from the attached claims as interpreted with the full breadth permitted by the patent laws.

What is claimed is:

1. Apparatus for visualizing operation of a system implemented by means of processes running in at least one computer system, the apparatus comprising:

monitoring means for causing at least one of the processes to send a message when the process performs an operating system call, the message indicating at least the process and the operating system call; and means for receiving the message and responding thereto by making an alteration in a graphical display of the system which includes at least an entity representing the one process, the alteration reflecting an effect on the system of the operating system call which resulted in the message being sent.

2. The apparatus set forth in claim 1 wherein:

the monitoring means further comprises a routine which makes the operating system call and sends the message.

3. The apparatus set forth in claim 2 wherein:

the monitoring means further comprises masking means for determining how the routine deals with the message; and the routine which makes the operating system call further deals with the message as indicated by the masking means.

4. The apparatus set forth in claim 3 wherein:

there is a masking means corresponding to each one of the processes.

5. The apparatus set forth in claim 4 wherein:

a child process receives a copy of the masking means corresponding to its parent.

6. The apparatus set forth in claim 4 wherein:

the monitoring means is capable of receiving a mask message and responding thereto by causing the masking means to determine according to the mask message how the routine deals with the sent message.

7. The apparatus set forth in claim 3 wherein:

the masking means includes first masking means which indicates whether the message is to be sent.

8. The apparatus set forth in claim 3 wherein:

the masking means includes second masking means which indicates a form for the message.

9. The apparatus set forth in claim 3 wherein:

the monitoring means is further responsive to an acknowledgement message;

the masking means includes third masking means which indicate whether the sent message is to be acknowledged; and the routine which makes the operating system call responds to the third masking means when the sent message is to be acknowledged by indicating therein that the sent message is to be acknowledged and awaiting the acknowledgement message.

10. The apparatus set forth in claim 2 wherein:

the routine is dynamically linked with a program executed by the process.

11. The apparatus set forth in claim 1 further comprising:

means responsive to a user of the apparatus for sending a control message; and wherein the monitoring means further responds to the control message by causing the process to behave as required by the control message.

12. The apparatus set forth in claim 11 wherein:

the monitoring means further comprises a routine which makes the operating system call and sends the message; and the routine waits for the control message to finish execution.

13. The apparatus set forth in claim 12 wherein:

the monitoring means includes masking means which indicate whether the sent message is to be acknowledged; and the routine which makes the operating system call responds to the masking means when the sent message is to be acknowledged by indicating therein that the sent message is to be acknowledged;

the means responsive to the sent message responds thereto when the sent message is to be acknowledged by providing an indication thereof to the user; and the user sends the control message in response to the indication.

14. The apparatus set forth in claim 1 further comprising:

means for controlling the manner in which the means responsive to the messages responds to the messages.

15. The apparatus set forth in claim 14 further comprising:

means for receiving the messages from the monitor means; and wherein the means responsive to the messages reads the messages from the means for receiving the messages; and the means for controlling the manner in which the means responsive to the messages responds to the messages does so by controlling how the means responsive to the messages reads the messages.

16. The apparatus set forth in claim 1 wherein:

the processes run in a plurality of computer systems; and the message further indicates the computer system upon which the one process is running.

17. The apparatus set forth in claim 1 wherein:

the message further indicates the arguments used in the operating system call and the results of the operating system call.

18. The apparatus set forth in claim 1 wherein:

the graphical display displays the system as a directed acyclic graph wherein the processes and resources used by the processes are nodes in the graph.

19. Apparatus for visualizing operation of a system implemented by means of processes running in at least one computer system, the apparatus comprising:

means for causing at least one of the processes to send a message when performing an operation of creating a child process or an operation of accessing a resource, the message indicating at least the operation and the one process; and means for receiving the message and responding thereto by making an alteration in a graphical display which displays the system as a directed acyclic graph wherein the processes and resources used by the processes are nodes in the graph, the alteration reflecting an effect on the system of the operation which resulted in the message being sent.

20. The apparatus set forth in claim 19 wherein:

the processes run in a plurality of computer systems; and the message further indicates the computer system upon which the one process is running.

21. The apparatus set forth in claim 19 wherein:

the message further indicates the arguments used in the operation which resulted in the message being sent and the results of that operation.

22. The apparatus set forth in claim 18 or 19 wherein:

a node's shape indicates whether the node represents one of the processes or one of the resources.

23. The apparatus set forth in claim 22 wherein:

the resources include file resources and communications resources; and the nodes for the file resources have a first shape and the nodes for the communications resources have a second shape different from the first shape.

24. The apparatus set forth in claim 18 or 19 wherein:

a first edge in the graph indicates a relationship between one of the processes and one of the resources.

25. The apparatus set forth in claim 18 or 19 wherein:

a second edge in the graph indicates a relationship between a first one of the processes and a second one thereof which is a descendent of the first one.

26. The apparatus set forth in claim 18 or 19 wherein:

the processes in the system execute on one or more processors; and the nodes for processes executing on a given one of the processors belong to a cluster representing the given processor.

27. The apparatus set forth in claim 18 or 19 wherein:

the message is one of a sequence thereof; and the means for generating the graphical display alters the graphical display as required by the message.

28. Apparatus for providing information about operation of a system which is implemented in a computer, the operation of the system including executing routines from a first library thereof and the apparatus comprising:

- a second library including second routines, each of which when executed performs the same function as one of the first routines and additionally generates a message indicating a change in the system resulting from execution of the routine;
- means for dynamically replacing the executable code for the first library with the executable code for the second library when the system is executed in the computer;
- masking means settable when the system is executed in the computer and accessible to the second routines, the masking means indicating how the second routines generate the messages and the second routines responding to the masking means by generating the messages as indicated therein; and
- means responsive to the messages for outputting indications of the effects on the system of the executions of the second routines.

29. The apparatus set forth in claim 28 wherein:
the state of the system is output as a graphical display of the system.

30. The apparatus set forth in claim 29 wherein:
the graphical display of the system displays the system as a directed acyclic graph wherein entities in the system appear as nodes in the graph and relationships between entities appear as edges in the graph.

31. The apparatus set forth in claim 28 further comprising:
means whereby a user of the apparatus provides a control message therefor;
and wherein
- the second library includes a control message receiving routine; and
- the second routines are responsive to the control message.

32. A method of obtaining information about a system implemented by means of processes running in a computer system, the method comprising the steps of:

- on initializing a monitor process, dynamically linking the monitor process to a first library of routines which has the same interfaces as a second library of routines, the routines in the first library performing the same functions as the routines in the second library and additionally sending messages to the monitor process, the dynamic linking being done in an environment such that processes which are descendants of the monitor process are also linked to the first library;
- creating the processes which implement the system as descendants of the monitor process; and
- in the monitor process, receiving the messages from the descendant processes and outputting information contained therein.

33. The method set forth in claim 32 wherein
the routines in the first library determine from a mask whether a message is to be sent and the environment is such that processes which are descendants of the monitor process also have the mask and
the method further comprises the step of:
- on initializing the monitor process, specifying the mask.

* * * * *